Oct. 31, 1961 A. E. COOKSON 3,007,044
FREQUENCY SEARCH AND TRACK SYSTEM
Filed Nov. 14, 1957
*Fig. 1*
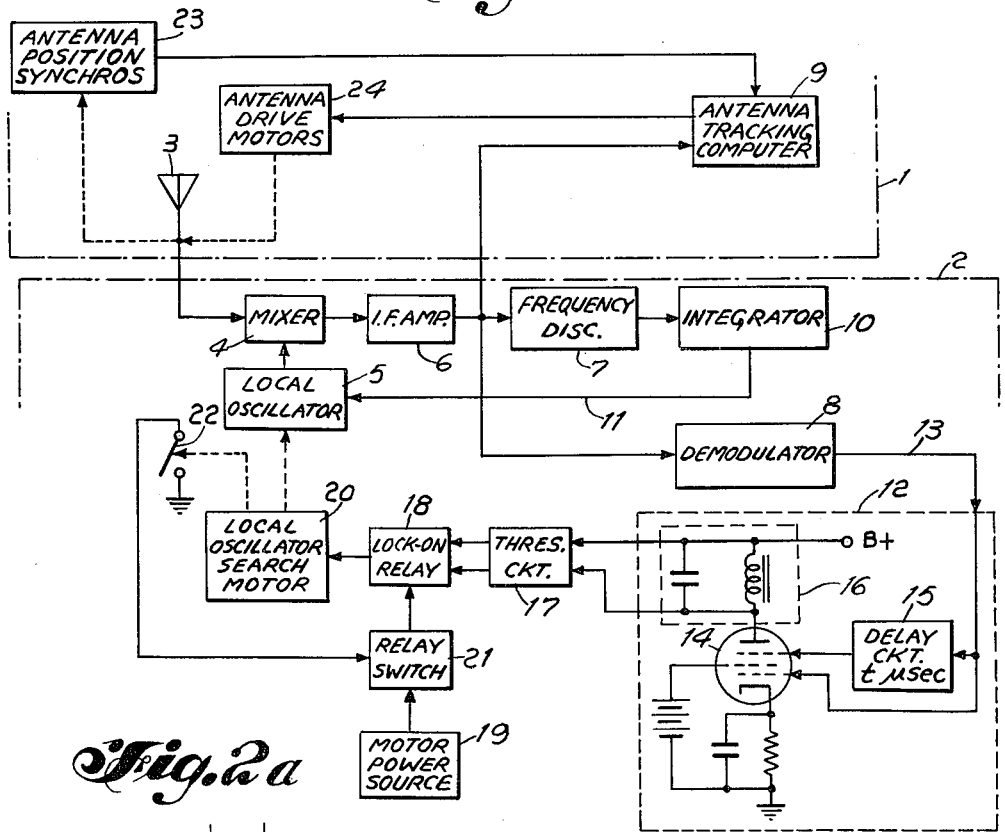
*Fig. 2a*
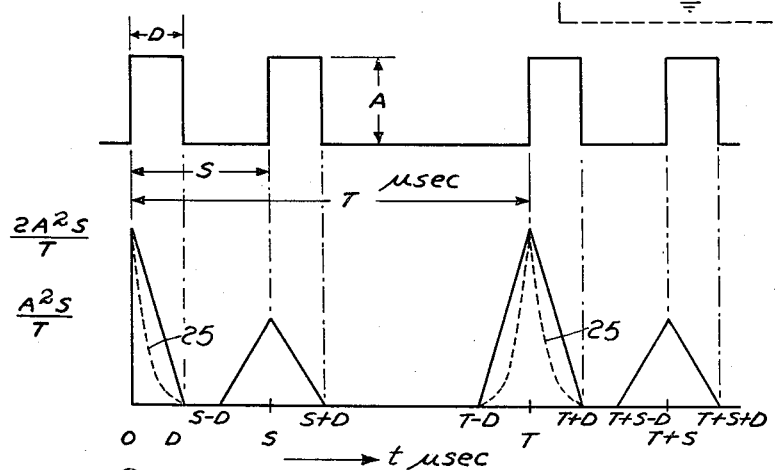
*Fig. 2b*
Inventor
ALBERT E. COOKSON
By Philip M. Bolton
Attorney

United States Patent Office 3,007,044
Patented Oct. 31, 1961

3,007,044
FREQUENCY SEARCH AND TRACK SYSTEM
Albert E. Cookson, Cedar Grove, N.J., assignor to International Telephone and Telegraph Corporation, Nutley, N.J., a corporation of Maryland
Filed Nov. 14, 1957, Ser. No. 696,555
3 Claims. (Cl. 250—20)

This invention relates to a system for detecting the presence of a signal of known wave shape in a composite signal and is particularly applicable to a frequency search and track system to cause frequency lock-on when a signal having a predetermined wave shape is detected.

The ground guidance unit for certain missiles must search in frequency and lock on to the frequency of an RF signal transmitted from the missile. For this purpose, various frequency search and tracking systems are employed which search a relatively wide band of frequencies and lock on and track the detected RF signal transmitted by the missile so that this signal from the missile may be employed in other systems of the ground guidance unit to track the position of the missile in space in azimuth and elevation.

In the past frequency search and track systems have been employed comprising superheterodyne receivers in which frequency scanning is accomplished by continuously varying the frequency of the local oscillator over a given range, then halting the scanning when the desired RF signal from the missile is detected and locking on to the desired signal frequency, after which automatic frequency tracking or control continues to shift the frequency of the local oscillator so that the desired RF signal is not lost. The transition from frequency search to frequency track is often referred to as lock-on and in the past has been accomplished in various ways.

One prior method of acquiring lock-on is to compare the noise received, in absence of the desired RF signal from the missile, with the desired RF signal and noise, the difference in levels indicating the presence of the missile RF signal and serving to anticipate lock-on.

Another prior method of acquiring lock-on is to peak ride the noise and energize a relay when the desired RF signal becomes sufficiently greater than the noise to raise the peak level a given amount. This method and other prior methods require that peak signal level be considerably above R.M.S. noise before lock-on can occur.

An object of this invention is to provide an improved system for detecting the presence of a given signal.

Another object is to provide a system capable of detecting the presence of a signal in noise when the peak signal is less than the R.M.S. level of the noise.

Another object is to provide a system for autocorrelating a mixed signal yielding an output indicative of the presence of a signal of predetermined wave shape in said mixed signal.

Another object is to provide an improved frequency search and track system wherein frequency lock-on is controlled by means which autocorrelate the received signal and noise to detect the presence of a given signal.

Another object is to provide an improved frequency search and track system whereby the acquisition range of a missile guidance unit may be increased.

It is a feature of this invention to employ a superheterodyne type receiver with a band centering AFC loop to track the received signal frequency once lock-on occurs.

It is another feature to provide motor means mechanically coupled to the local oscillator in the superheterodyne receiver to cause that oscillator to sweep a relatively wide band of frequencies in search before lock-on occurs.

It is another feature to provide autocorrelation means whose output controls a lock-on switch and is responsive to the presence of a given predetermined signal in the received signal.

It is a further feature to autocorrelate with a single pentode by feeding the signal to be autocorrelated directly to the pentode control grid and also to a known delay circuit whose output is coupled to the pentode suppressor grid and integrating the pentode plate current by means of an LC circuit.

Other and further features and objects of this invention will be apparent with reference to the following description taken in conjunction with the accompanying drawings in which:

FIG. 1 is a block diagram and electrical schematic of the improved frequency search and track system used in conjunction with a missile ground guidance unit; and FIG. 2a depicts the modulating signal transmitted by the missile, and FIG. 2b depicts its autocorrelation function and the noise autocorrelation function.

Referring to FIG. 1 there is shown the antenna tracking system 1 and the automatic frequency search system 2 of a missile ground guidance unit. Since this invention is concerned with the automatic frequency search system 2, extensive details of system 1 will be omitted.

In operation an RF signal from the missile modulated by a waveform, such as shown in FIG. 2a, and noise are detected by antenna 3. The signal from antenna 3 is fed to mixer 4 where it is beat against the signal from klystron local oscillator 5. The beat frequency is fed to IF amplifier 6 whose output is coupled to frequency discriminator 7, demodulator 8, and antenna track computer 9. The output from frequency discriminator 7 is fed to integrator circuit 10, which integrates the positive or negative IF pulses appearing at the output of discriminator 7 and applies them via line 11 as a D.C. voltage to the repeller electrode of klystron local oscillator 5 to control the oscillator in accordance with the "S" curve characteristic of the discriminator output. Thus the D.C. voltage applied to klystron local oscillator 5 via line 11 completes a band centering AFC loop causing the local oscillator frequency to shift as required to track the RF signal frequency energizing antenna 3, which when beat with the oscillator frequency produces a frequency falling within the response of IF amplifier 6 and frequency discriminator 7. The output of IF amplifier 6 is also fed to demodulator 8, which demodulates this output to yield the pulse forms such as shown in FIG. 2a. These pulses which may be accompanied by considerable noise are fed to autocorrelation circuit 12 via line 13 where the presence of the pulses is detected.

Autocorrelation circuit 12 is comprised of pentode 14 which is preferably a 6SA7 or 6AS6 tube having its control grid coupled directly to line 13, its suppressor grid coupled to a known delay circuit 15 and thence to line 13 and its screen grid coupled to a fixed bias potential so that the pulses from demodulator 8 are applied directly to the control grid and are applied to the suppressor grid after a known delay, say $t$ microseconds. It is a characteristic of such a pentode, as the 6SA7 when circuited as shown in FIG. 1, to yield plate current proportioned to the product of control grid voltage times suppressor grid voltage when the screen grid is properly biased. (See paragraph 19.3, volume 19 of MIT Radiation Laboratory Series, published in 1949 by McGraw-Hill Book Company.) The plate current from pentode 14 is integrated by LC circuit 16 so that the voltage developed by this circuit is essentially proportional to the autocorrelation function of the signal applied to the control grid of pentode 14. A voltage proportional to this integrated plate current is then fed to threshold circuit 17, which energizes lock-on relay 18 when a sufficient predetermined voltage exists across LC circuit 16. When de-energized, relay 18 applies power derived from motor power source 19 to local oscillator search motor 20, provided relay switch 21 is energized. When energized, relay 18 cuts off power to motor 20 and frequency search stops. Relay switch 21 is energized whenever search motor cam operated switch 22 is closed.

The action of autocorrelation circuit 12 is to autocorrelate a signal, such as shown in FIG. 2a, and the noise accompanying it. The suggested signal shown in FIG. 2a is composed of pairs of pulses, T microseconds between pairs, each pulse having a width D, a height A and separated from its nearest adjacent pulse by S microseconds. The autocorrelation function of this train of pulses is shown in FIG. 2b for a range of $t$ extending from zero microseconds to $T+S+D$ microseconds. Dotted curve 25 also shown in FIG. 2b is the autocorrelation function of a typical noise pattern which might accompany the pulse train shown in FIG. 2a. Obviously, if a composite signal of pulses and noise is autocorrelated at a fixed $t$ between 0 to D microseconds, the autocorrelation function of the composite signal would not readily serve to distinguish the presence of signal pulses rather than noise. However, if $t$ were fixed at, for instance S microseconds, the autocorrelation function would have a relative amplitude of $A^2D/T$ due to the presence of the signal pulses shown in FIG. 2a and be relatively unaffected by the presence of noise. Obviously other values of $t$ may be chosen to yield the same result, such as values equivalent to $NT+S$ microseconds where N is any whole number.

During search, the frequency of klystron local oscillator 5 is repeatedly varied over a wide band by local oscillator search motor 20 mechanically linked by means such as, for example, a cam to the resonators of the klystron local oscillator 5. The system is designed to scan in one direction, that is, from the lowest local oscillator frequency to the highest. Thus the motor 20 drives a cam which sweeps klystron local oscillator 5 over its frequency range during 330 degrees of cam rotation and retraces frequency in the remaining 30 degrees. On the retrace a second cam opens switch 22, deenergizing relay switch 21 and preventing power from motor power source 19 from passing to lock-on relay 18.

After searching has stopped, the automatic tracking control takes over. For this purpose the output of integrator 10 is applied via line 11 to the repeller electrodes of klystron local oscillator 5, controlling the local oscillator in accordance with the "S" curve characteristic output of frequency discriminator 7.

The RF signal transmitted by the missile and detected by antenna 3, upon passing through mixer 4 and IF amplifier 6, is fed to antenna tracking computer 9 where means are provided to compare it with signals from antenna position synchros 23 to yield appropriate signals to power antenna drive motors 24 positioning antenna 3. This antenna tracking system 1 operates in such a manner as to cause antenna 3 to track the missile transmitting the RF signal in azimuth and elevation and may be any suitable conventional system.

While I have described the above principles in my invention in connection with specific apparatus, it is to be clearly understood that this description is made only by way of example and not as a limitation to the scope of my invention as set forth in the objects thereof and in the accompanying claims.

I claim:
1. A frequency search and track system for searching received signals and noise until a particular signal having a known wave shape is detected after which said receiver means is controlled to frequency track said particular signal said system comprising the combination of a superheterodyne-type signal receiver means tunable over a band of frequencies containing said particular signal, motor means mechanically coupled to the local oscillator of said superheterodyne detector which continuously tunes said detector over said band of frequencies during frequency search, automatic frequency control means coupled to said local oscillator to shift tuning of said superheterodyne detector during frequency track, autocorrelating means to detect the presence of a signal having said known wave shape in accompanying noise in the output of said superheterodyne detector, said autocorrelating means comprising a multigrid tube, an input delay circuit and an integrating circuit, said delay being such that the autocorrelation function of said signal of known waveshape is considerably greater than the autocorrelation function of said noise, means coupling the output of said autocorrelating means to switching means which controls power to said motor means, the output of said autocorrelating means and said switching means being such that continuous frequency search is stopped when said signal of known wave shape is detected in sufficient strength relative to noise which is detected or inherent to the system.

2. A frequency search and track system comprising the combination of signal detection means tunable over a band of frequencies, means to continuously tune said detection means over said band of frequencies during frequency search, automatic frequency control means to shift tuning of said detection means during frequency track, means to control said continuously tuning means comprising autocorrelating means for autocorrelating the output derived from said detection means with a delayed replica thereof, said delay being such that the autocorrelation function of a desired signal of known waveshape is considerably greater than the autocorrelation function of the noise accompanying said desired signal, said autocorrelating means having an input and an output, means coupling the input of said autocorrelating means to the output of said detection means, switching means, responsive to an applied voltage having a given threshold level, coupled to said continuously tuning means to halt operation thereof, and means coupling the output of said autocorrelating means to said switching means to halt operation of the continuously tuning means when the output of said detection means contains a signal of said known waveshape.

3. A frequency search and track system comprising the combination of signal detection means tunable over a band of frequencies, means to continuously tune said detection means over said band of frequencies during frequency search, means to control said continuously tuning means comprising autocorrelating means for autocorrelating the output derived from said detection means with a delay replica thereof, said delay being such that the autocorrelation function of a desired signal of known waveshape is considerably greater than the autocorrelation function of the noise accompanying said desired signal, said autocorrelating means having an input and an output, means coupling the input of said autocorrelating means to the output of said detection means, switching means, responsive to an applied voltage having a given threshold level, coupled to said continuously tuning means to halt operation thereof, and means coupling the output of said autocorrelating means to said switching means to halt operation of the continuously tuning means when the output of said detection means contains a signal of said known waveshape.

References Cited in the file of this patent
UNITED STATES PATENTS

| | | |
|---|---|---|
| 2,262,931 | Guanella | Nov. 18, 1941 |
| 2,580,148 | Wirkler | Dec. 25, 1951 |
| 2,718,638 | De Rosa et al. | Sept. 20, 1955 |
| 2,812,430 | Gierwiatowski | Nov. 5, 1957 |
| 2,885,546 | Taylor et al. | May 5, 1959 |
| 2,896,162 | Berger et al. | July 21, 1959 |